US006957660B2

(12) United States Patent
Holder

(10) Patent No.: US 6,957,660 B2
(45) Date of Patent: Oct. 25, 2005

(54) PRESSURE RELIEF VALVE WITH BIDIRECTIONAL DAMPING

(75) Inventor: Robert E. Holder, Los Angeles, CA (US)

(73) Assignee: Eaton Corporation, Cleveland, OH (US)

( * ) Notice: Subject to any disclaimer, the term of this patent is extended or adjusted under 35 U.S.C. 154(b) by 281 days.

(21) Appl. No.: 10/383,116

(22) Filed: Mar. 6, 2003

(65) Prior Publication Data

US 2004/0173264 A1 Sep. 9, 2004

(51) Int. Cl.[7] .............................................. F16K 17/04
(52) U.S. Cl. ...................... 137/494; 137/454.5; 251/50
(58) Field of Search ............................ 137/454.5, 494, 137/514.7; 251/50

(56) References Cited

U.S. PATENT DOCUMENTS

| | | | | |
|---|---|---|---|---|
| 2,351,512 A * | 6/1944 | Holt | 137/494 |
| 3,578,019 A * | 5/1971 | Turolla | 137/491 |
| 3,752,174 A | 8/1973 | Turolia | |

FOREIGN PATENT DOCUMENTS

| | | |
|---|---|---|
| DE | 32 00 526 | 7/1983 |
| DE | 196 30 212 | 7/1997 |
| DE | 196 45 172 | 5/1998 |
| DE | 199 46 848 | 4/2001 |
| DE | 101 20 643 | 5/2002 |
| GB | 810 835 | 3/1959 |

OTHER PUBLICATIONS

Sheet with two drawings of Assignee's prior valves.

* cited by examiner

*Primary Examiner*—Stephen M. Hepperle
(74) *Attorney, Agent, or Firm*—Quarles & Brady LLP

(57) ABSTRACT

A pressure relief valve has a valve element that is biased by a spring into a closed position. A pressure being controlled is applied to the valve element to counter the force of the spring. When the pressure applied to the valve element exceeds the force of the spring the pressure relief opens, otherwise the valve closes. The pressure is applied through a damping orifice which controls the rate at which the applied pressure can increase and decrease thus delaying the response of the pressure relief valve to pressure changes in both directions. The relative size relationship between the inlet and outlet can be varied to define the pressure-flow characteristic of the pressure relief valve.

16 Claims, 2 Drawing Sheets

PRESSURE RELIEF VALVE WITH BIDIRECTIONAL DAMPING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to pressure relief valves which open when a pressure differential across valve exceeds predefined level.

2. Description of the Related Art

Pressure relief valves are provided at various locations in a hydraulic system to limit the maximum pressure to less then a predefined threshold level. For example, a pressure relief valve is normally provided at the outlet of a pump so that the supply line cannot be pressurized to an excessively high level. Should the pressure threshold level be exceeded, the relief valve opens creating a path usually to the hydraulic system reservoir, or tank. Another pressure relief valve is frequently provided at the workport of a control valve assembly to which a hydraulic actuator, such as a piston and cylinder combination, is connected. This arrangement protects against shock loading or inertia overloading due to the load which acts on the piston and cylinder. If that load creates an excessively high pressure within the hydraulic lines attached to the cylinder, the workport pressure relief valve opens to relieve the excessive pressure to the system tank. The workport relief valve remains open until the load condition no longer exists and pressure within the associated hydraulic line decreases below the threshold of the relief valve.

A common type of relief valve has a movable element biased against a valve seat by a spring to maintain the valve in the closed state. When pressure acting on the valve element exceeds the force of the spring, the valve element moves away from the seat, thereby opening the pressure relief valve. In this type of valve, the valve opens as soon as the spring force is exceeded and closes immediately upon the pressure dropping below the spring force.

In some relief valve applications, it is desired that the valve not open immediately when the pressure threshold is exceeded, but rather require that the excessive pressure should be required to exist for a given amount of time. Thus, the pressure relief valve will be immune from sporadic, short duration pressure excursions which exceed the threshold level. Nevertheless, when the pressure exceeds the threshold setting for longer than the given amount of time, the valve opens to relieve that pressure before damage to the hydraulic system can occur. Inversely, it is also desirable in certain situations to delay the valve closing to ensure that the pressure remains below the threshold. This prevents a momentary pressure decrease from closing the valve in a situation where pressure relief is still required.

Therefore, it is desirable to provide a pressure relief valve with bidirectional damping of the valve action, so as to provide hysteresis.

SUMMARY OF THE INVENTION

A pressure relief valve includes a body having a bore with an inlet and an outlet. A valve element is movably received within the bore and defines a chamber within the bore. In a first position of the valve element in the bore, a path exists between the inlet and the outlet, whereas in a second position the valve element closes that path. A damping orifice is formed in either of the body or the valve element to enable fluid to flow between the inlet and the chamber. A spring biases the valve element into the second position.

The pressure to be limited by the relief valve is applied to the inlet from which the pressure is transmitted through the damping orifice into the chamber in the bore of the housing. As the pressure at the input changes, the damping orifice delays application of that pressure change to the chamber and the size of the damping orifice determines the rate at which the relief valve responds to the pressure change. Thus a new pressure level must exist for at least a certain period of time before that pressure will occur in the chamber in the housing bore.

When the pressure in the chamber is greater than a threshold level set by the force of the spring, the valve element moves from the second position to the first position in which a path is opened between the inlet and outlet.

When the pressure decreases thereafter, the damping orifice delays application of the pressure decrease to the housing bore chamber so that the lower pressure level must occur for the certain period of time before that pressure occurs in the chamber. When the chamber pressure is less than the threshold level set by the spring, the spring force drives the valve element into the second position at which the path between the inlet and outlet is closed.

Thus the damping orifice provides energy dissipation to the bidirectional motion of the relief valve.

DETAILED DESCRIPTION OF THE INVENTION

Figure 2:
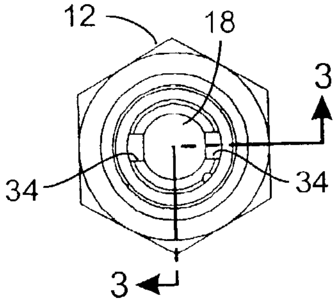
FIG. 2 is a view of the nose end of the pressure relief valve.
Figure 1:
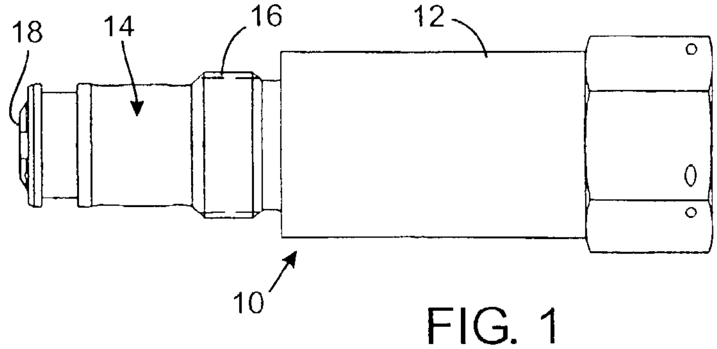
FIG. 1 is a side view of a pressure relief valve according to the present invention.
Figure 3:
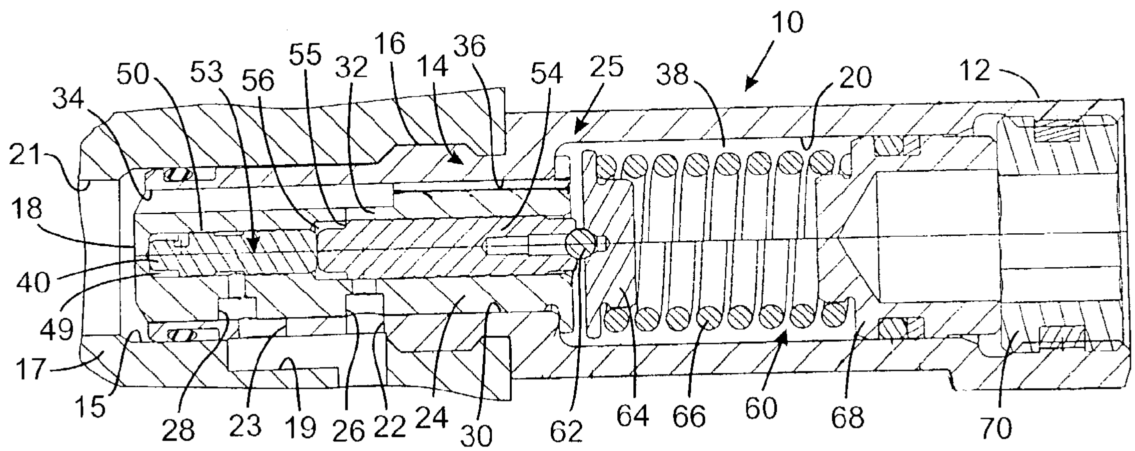
FIG. 3 is a longitudinal, cross-sectional view of the pressure relief, taken along line 3—3 of FIG. 2 and mounted in a valve block.

With initial reference to FIGS. 1–3, a pressure relief valve 10 has a cylindrical housing 12 with a reduced diameter portion 14 for insertion into an aperture 15 of a valve block 17 or hydraulic manifold. A threaded region 16 of housing portion 14 engages threads in the aperture 15 to secure the valve in place. The valve block 17 has passages through which hydraulic fluid flows. A first of these passages 19 opens into the aperture 15 to one side of the reduced diameter portion 14 of the pressure relief valve 10 as seen in FIG. 3. As will be described, the pressure relief valve responds to the pressure level in this first passage 19. A second passage 21 in the valve block 17 opens into the bottom of the block aperture 15 adjacent a nose 18 of the pressure relief valve on and typically leads to the system tank.

Referring to FIG. 3, the valve housing 12 has a generally tubular shape with a central bore 20 extending there through. The housing 12 has a first and second transverse apertures 22 and 23 extending through the wall of the reduced diameter portion 14 and communicating with first passage 19 in the valve block. A tubular sleeve 24 is secured within the portion of the housing bore 20 that is within the reduced diameter portion 14. The housing 12 and the sleeve 24 form a body 25 of the valve 10. The sleeve 24 has an inlet 26 and sensing aperture 28 extending transversely there through and opening into the first and second transverse apertures 22 and 23, respectively, to provide a paths for fluid to flow from the first block passage 19 to different regions of a central bore 30 within the sleeve. The sleeve bore 30 has an open end facing a spring cavity 38 in the housing bore 20 and has a closed end at the nose 18 of the pressure relief valve. An outlet 32 extends through the sleeve 24 between the sleeve bore 30 and a longitudinal groove 34 that leads to the nose 18 along the outside surface of the sleeve. A smaller groove 36 connects the larger longitudinal groove 34 to the opposite end of the sleeve 24 and opens into the spring cavity 38. As indicated by the section line 3—3 in FIG. 2, the two grooves 34 and 36 are offset 90° around the longitudinal axis of the valve sleeve 24 from the inlet 26 and sensing aperture 28.

A sensing piston 40 is slidably received within the bore 30 of the sleeve 24 and abuts the closed end of that bore. With additional reference to FIG. 4, the sensing piston 40 has three lands 41, 42 and 43 formed there around with corresponding annular grooves 44 and 45 between adjacent lands. The middle land 42 has a smaller diameter than the outer lands 41 and 43 so that the annular grooves 44 and 45 are in fluid communication with one another when the sensing piston 40 is in the sleeve bore 30. Thus the recess in the sensing piston formed by the middle land 42 and grooves 44 and 45 creates a sleeve cavity in bore 30. A reduced diameter tip portion 46 is located between the first land 41 and a first end 48 of the sensing piston which end abuts the bottom of the sleeve bore 30 in the closed state of the relief valve 10 shown in FIG. 3. The tip portion 46 creates a sensing chamber 49 within the sleeve bore 30. A damping orifice 50 is provided by a longitudinal notch in the first land 41 between the tip portion 46 and the first annular groove 44. As seen specifically in FIG. 3, the sensing aperture 28 in the sleeve 24 opens into the first annular groove 44 of the sensing piston 40. Thus pressurized fluid from the first passage 19 is applied to the first annular groove 44 and via the damping orifice 50 to the sensing chamber 49.

The second end 52 of the sensing piston 40 abuts a valve piston 54 which also is slidably received in the bore 30 of the sleeve 24. The sensing piston 40 and the valve piston 54 combined form a valve element 53. Although the preferred valve element 53 is segmented into two pistons 40 and 54 a single piece valve element can be utilized. An intermediate chamber 56 is formed within the sleeve bore 30 at the interface between the two pistons 40 and 54. In the illustrated closed position of the pressure relief valve 10, the valve piston 54 closes communication of the inlet 26 and outlet 32 with the intermediate chamber 56.

The end of the valve piston 54 remote from the sensing piston 40 engages a spring assembly 60, which exerts a force on the valve piston to urge the valve piston into the illustrated closed state. The spring assembly 60 has a ball bearing 62 which fits within recesses in the valve piston 54 and a guide disk 64 to provide a pivot coupling between those components. The guide disk 64 abuts one end a compression spring 66 that extends through the spring cavity 38 in housing 12 with another end that abuts a guide 68 slidably located within the housing bore 20. A retainer 70 is threaded into an end of the bore 40 in housing 12. By varying the depth to which the retainer 70 is threaded into the housing bore 20, the force that the spring 66 applies to the valve element 53 can be adjusted, thereby defining the pressure threshold of the relief valve 10.

Figure 4:
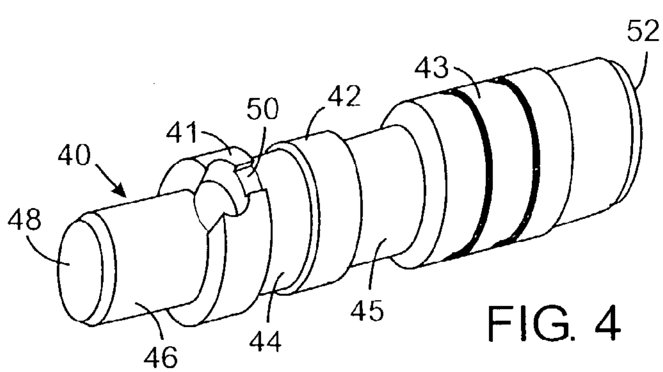
FIG. 4 is an isometric view of a pressure sensing piston within the pressure relief valve.

The pressure being controlled is applied from the first block passage 19 through the second transverse aperture 23 in the valve housing 12 and the sensing aperture 28 in the sleeve 24, thereby reaching the annular grooves 44 and 45 around the sensing piston 40 (FIGS. 3 and 4). The pressure then bleeds through the damping orifice 50 into the sensing chamber 49 at the bottom of the sleeve bore 30. As the pressure at the second transverse aperture 23 changes, the damping orifice 50 delays application of that pressure to the sensing chamber 49.

Figure 5:
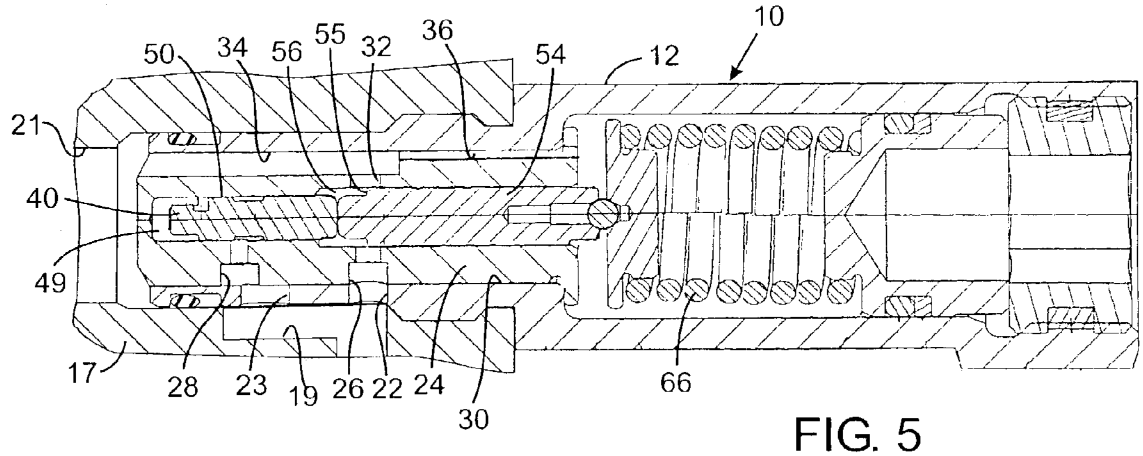
FIG. 5 is a longitudinal, cross-sectional view of the pressure relief in an open state.

Assuming that the pressure increases above the threshold setting of the pressure relief valve 10, that pressure level eventually occurs within the sensing chamber 49 and is applied to the end surfaces of the sensing piston 40. This creates a force that tends to move the sensing piston 40 to the right in the orientation of the pressure relief valve 10 in FIG. 3. Because this force exerted on the sensing piston 40 is greater than the force from the spring 66, the sensing piston and the valve piston 54 move to the right within bore 30 as depicted in FIG. 5.

As a shoulder 55 on the valve piston 54 moves past the inlet 26 in the sleeve 24, the inlet 26 is opened into the intermediate chamber 56. The relatively high pressure is applied through this path to the surface of shoulder 55 which adds to the force that counteracts the spring force. Movement of the valve piston 54 also opens the intermediate chamber 56 to the outlet 32 leading into the longitudinal groove 34. This provides a fluid path through the pressure relief valve 10 from the first passage 19 in the valve block 17 to the second passage 21 leading to the hydraulic system tank, thereby relieving the pressure in the first passage.

As the pistons 40 and 54 move into the spring cavity 38 of the housing 12, any fluid displaced by that motion is exhausted to the system tank through the longitudinal grooves 34 and 36 along the sleeve 24. Thus, pressure does not build-up in the spring cavity 38 which would otherwise impede the movement of the pistons and the operation of the pressure relief valve.

Assume that with the pressure relief valve 10 is in the open state; and pressure at the first passage 19 then decreases below the predefined threshold level set by spring 60. Now the high pressure in the sensing chamber 49, which caused the valve to open, is gradually relieved through the dampening orifice 50 and then via the sensing aperture 28 and the second transverse housing aperture 23. As the pressure within sensing chamber 49 decreases, the pistons 40 and 54 move toward the closed end of the sleeve 24 (to the left in the orientation shown in FIG. 5). Eventually, the first end 48 of the sensing piston 40 abuts that closed end of the sleeve 24 and the pressure relief valve closes, as shown in FIG. 3. Specifically in the closed state, the location of the valve piston 54 within bore 30 blocks the openings of the inlet 26 and outlet 32 into the intermediate chamber 56, thereby shutting the path through the pressure relief valve 10. The expanding volume of the spring cavity 38, produced as the valve piston 54 moves farther into the sleeve bore 30, is filled by fluid drawn through the smaller longitudinal sleeve groove 36.

The damping orifice 50, provided in the external surface of the sensing piston 40, limits the rate at which pressure within the sensing chamber 49 is able to change, thereby preventing rapid transitions of the pressure relief valve 10 between open and closed states. The size of the damping orifice 50 can be varied during manufacture to tailor the response rate for a particular application of the valve.

Figure 6:
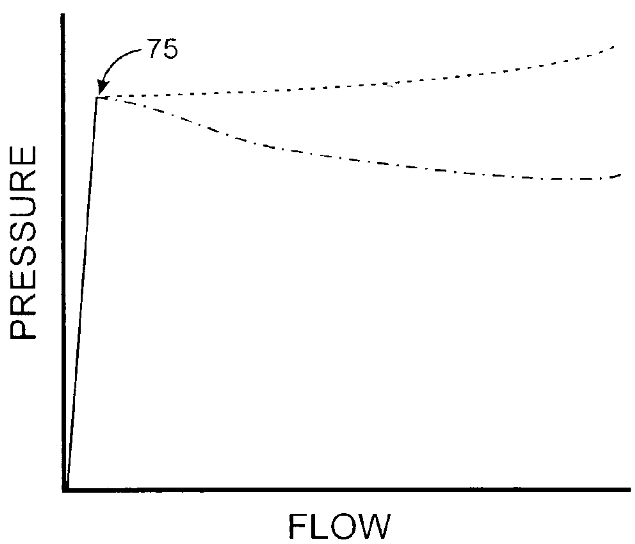
FIG. 6 is a graph depicting how the pressure-flow characteristic of the pressure relief valve is a function of the relative sizes of the inlet and outlet openings.

The pressure-flow characteristic of the pressure relief valve 10 also can be tailored by varying the relative sizes of the inlet 26 through which the fluid enters the intermediate chamber 56 and the outlet 32 through which the fluid exits the intermediate chamber. Specifically when the inlet 26 is smaller than the outlet 32 the pressure continues to increase as the flow increases after the relief valve 10 opens at point 75, as indicated by the upper curve in FIG. 6. In contrast, when the inlet 26 is larger than the outlet 32, the pressure generally decreases as the flow increases as depicted by the lower curve of the graph.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

I claim:

1. A pressure relief valve comprising:

a body having a bore with an inlet and an outlet;

a sensing piston movably received within the bore and defining a sensing chamber in the bore, the sensing piston having a surface exposed to pressure in the sensing chamber;

a valve piston moveable within the bore along an axis and abutting the sensing piston, wherein the valve piston has a first position which opens a path between the inlet and the outlet and has a second position in which the path is closed, wherein when the path is closed pressure at the inlet only acts on the valve piston transverse to the axis;

a damping orifice through which fluid flows bidirectionally between the inlet and the sensing chamber to thereby limit a rate at which the sensing piston responds to pressure changes at the inlet; and a spring biasing the valve piston into the second position and wherein pressure within the sensing chamber that is greater than a threshold level causes the valve piston to move to the first position.

2. The pressure relief valve as recited in claim 1 wherein the spring abuts the valve piston.

3. The pressure relief valve as recited in claim 1 wherein the damping orifice is formed by a groove in a surface of the sensing piston.

4. The pressure relief valve as recited in claim 1 wherein the sensing piston has a recessed portion which forms a cavity in the bore into which pressure at the inlet is applied, and a passage extends between the recessed portion and one end of the sensing piston with the damping orifice being formed in that passage.

5. The pressure relief valve as recited in claim 1 wherein the sensing piston has a recessed portion which forms a cavity in the bore into which pressure at the inlet is applied, and the damping orifice is formed by a groove extending between the recessed portion and one end of the sensing piston.

6. The pressure relief valve as recited in claim 1 wherein the sensing piston has a first surface which is in the exposed to pressure in the sensing chamber and a second surface which is in the exposed to pressure in the path between the inlet and the outlet, wherein a differential in areas of the first surface and the second surface affects a pressure-flow characteristic of the pressure relief valve.

7. The pressure relief valve as recited in claim 1 wherein a relative size relationship between the inlet and outlet defines a pressure-flow characteristic of the pressure relief valve.

8. A pressure relief valve comprising:

a housing having a first bore with an open end and having a first aperture and a second aperture communicating with the first bore to form passages through which fluid enters the housing;

a sleeve within the first bore and having a second bore therein with a closed first end and a second end that opens into the first bore, the sleeve including an inlet extending between the first aperture of the housing and the second bore a sensing aperture extending between the second aperture of the housing and the second bore and an outlet extending between the second bore and a first groove formed between the housing and the sleeve, wherein the first groove communicates with the open end of the first bore;

a sensing piston movably received within the second bore and defining a sensing chamber at the closed first end of the second bore, the sensing piston having a surface exposed to pressure in the sensing chamber;

a valve piston abutting the sensing piston in the second bore, wherein the valve piston has a first position which opens a path between the inlet and the outlet and has a second position in which the path is closed;

a damping orifice formed in one of the sleeve and the sensing piston and through which fluid flows between the inlet and the sensing chamber; and a spring within the first bore and biasing the valve piston into the second position, and wherein pressure within the sensing chamber being greater than a threshold level causes the valve piston to move to the first position.

9. The pressure relief valve as recited in claim 8 wherein the first groove is formed in an exterior surface of the sleeve.

10. The pressure relief valve as recited in claim 8 wherein the spring is received within a spring cavity in the first bore, and a bleed passage is provided between the spring cavity and the open end of the housing.

11. The pressure relief valve as recited in claim 8 wherein the spring abuts the valve piston.

12. The pressure relief valve as recited in claim 8 wherein the damping orifice is formed by a second groove in a surface of the sensing piston.

13. The pressure relief valve as recited in claim 8 wherein the sensing piston has a recessed portion which forms a cavity in the second bore into which pressure at the inlet is applied, and a passage extends between the recessed portion and one end of the sensing piston with the damping orifice being formed in that passage.

14. The pressure relief valve as recited in claim 8 wherein the sensing piston has a recessed portion which forms a cavity in the second bore into which pressure at the inlet is applied, and the damping orifice is formed by a second groove extending between the recessed portion and one end of the sensing piston.

15. The pressure relief valve as recited in claim 8 wherein the size of the damping orifice controls at rate at which pressure is communicated between the inlet and the sensing chamber.

16. The pressure relief valve as recited in claim 8 wherein a relative size relationship between the inlet and outlet is variable to define a pressure-flow characteristic of the pressure relief valve.

* * * * *